Patented Oct. 2, 1951

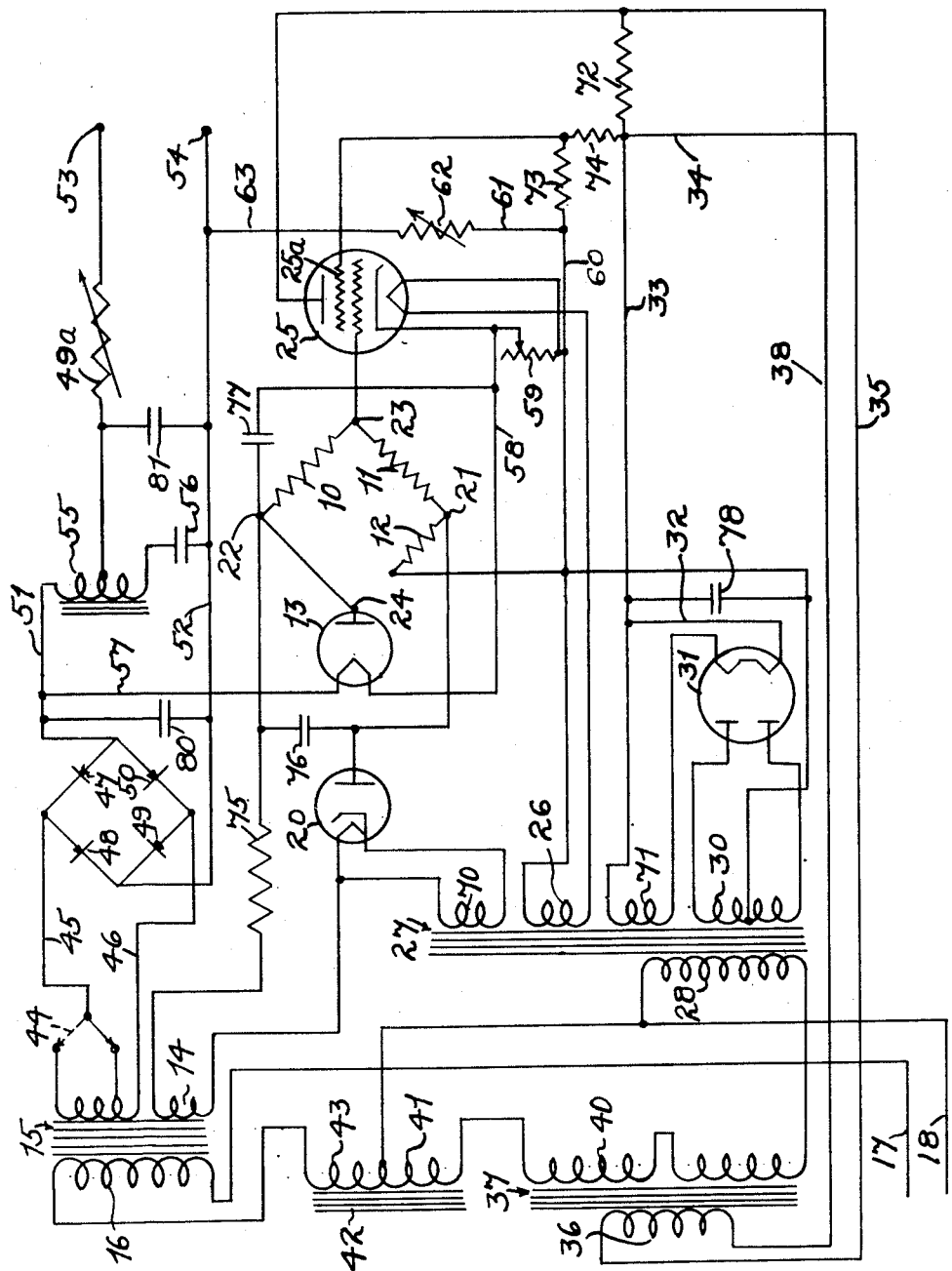

2,569,500

UNITED STATES PATENT OFFICE 2,569,500

VOLTAGE REGULATOR

Edward M. Sorensen, deceased, late of Stamford, Conn., by Helen S. Sorensen, administratrix, Stamford, Conn.; said Helen S. Sorensen, now by marriage Helen S. Moore, assignor to Sorensen & Company, Inc., Stamford, Conn., a corporation of Connecticut Application April 11, 1947, Serial No. 740,953

9 Claims. (Cl. 321—25)

This invention relates to voltage regulators and particularly to such regulators for regulating a direct current voltage output derived from an alternating current input.

More particularly still the invention relates to voltage regulators of the type described in which electronic means are employed to effect the regulation.

Still more particularly the invention relates to the utilization of a diode electron tube having a tungsten filament which is utilized as the primary control element. The emission of the filament is governed by the output voltage and this emission in turn determines the internal resistance of the diode electron tube and by utilization of this tube in a balancing network control of the voltage output is attained.

In the copending application of Edward M. Sorensen, Serial No. 662,751, filed April 17, 1946 for "Voltage Regulator," now Patent No. 2,455,143, there was described a regulator generally similar to the one herein described except that that regulator was designed to regulate an alternating current output when the input was likewise alternating.

It is an object of the invention to provide a voltage regulator which will maintain a direct current ouput voltage constant to within a fraction of 1% despite variation of the load or of the alternating current input voltage, or both.

It is another object of the invention to provide such a voltage regulator in which the control is electronic in nature.

It is a further object of the invention to provide a voltage regulator in which the electronic control includes a diode electron tube arranged in a balancing or bridge circuit and is used to detect variations in the output voltage and to apply correction for such variation.

Other objects and features of the invention will be apparent when the following description is considered in connection with the annexed drawings, in which—

The figure is a schematic wiring diagram of one form of my invention in which a full wave selenium rectifier is utilized to convert an A. C. voltage output to D. C. output and the D. C. output in turn governs the temperature of the tungsten filament of a temperature limited diode to thereby vary the reactance of a saturable core reactor which in turn modifies the A. C. output voltage applied to the rectifier to prevent any appreciable variation in the resulting D. C. output voltage.

Referring now to the drawing, there is shown therein a bridge circuit comprising the resistors 10, 11 and 12 and a tungsten filament diode 13. As has been stated, this diode with its network in the present instance comprising the resistances 10, 11, and 12 is the primary control unit of the voltage regulator. The input of the bridge circuit is derived from the secondary 14 of the transformer 15, the primary 16 of which is connected across the A. C. input line 17 and 18, the primary being in series with a winding of an autotransformer as will presently appear. Across the bridge arm containing the diode 13 is a capacitance 77 to prevent fluctuations in the power supplied therto from affecting the output of the bridge.

The transformer secondary 14 is connected to a rectifier tube 20 through resistance 75 and a capacitance 76 and the D. C. ouput of this tube is in turn connected to the input terminals 21 and 22 of the bridge 10, 11, 12 and 13, previously described. Connected across the opposite terminals 23 and 24 of the bridge circuit is the input circuit of an amplifier tube 25. Tube 25 is supplied with filament current by means of the secondary winding 26 of power transformer 27, the primary 28 of which is connected directly across the line 17—18. Plate current is supplied to tube 25 from the secondary 30 of power transformer 27 through the full wave rectifier 31, across the output of which is connected capacitance 78, and thence over conductors 32, 33, 34, 35, the saturating winding 36 of the saturable core reactor 37 and the conductor 38 to the plate of the tube 25.

Saturable core reactor 37 is provided with an alternating current winding 40 which winding is in series with a portion 41 of the winding of an autotransformer 42, the other portion 43 of the winding of autotransformer 42 being in series with the primary 16 of the transformer 15 as previously mentioned. Transformer 15 is also provided with a secondary 44 which secondary is connected by means of conductors 45 and 46 to the input of a bridge type rectifier composed of four selenium rectifiers 47, 48, 49 and 50. The output of the rectifier is in turn connected by means of conductors 51 and 52 to the output terminals 53 and 54. It will be noted that conductor 51 does not lead directly to terminal 53 but instead, passes through a portion of a choke coil 55 which serves to filter out any ripple which might be present in the D. C. output. Condenser 56 is connected across the output terminals to accentuate the filtering action.

The filament of the diode 13 is connected by means of conductor 57 with terminal 53 through the conductor 51 and by conductor 58, variable resistance 59, conductor 60, conductor 61, variable resistance 62, conductor 63 to terminal 54. In other words, the filament of the diode 13 is connected across the D. C. output and the temperature thereof is varied in accordance with variations in that output.

The lead 57 instead of being connected to conductor 51 as shown may be connected to conductor 51 at a point between the connections of condensers 56 and 81. This connection is sometimes advantageous since it utilizes the resistance of the coil 55 to vary the character of the load compensation.

From the above it will be seen that the basic power circuit comprises the autotransformer 42 and a saturable core reactor 37, this reactor being in series with the primary of the autotransformer. The autotransformer portion 43 of the autotransformer 42 is connected in series with the primary winding 16 of transformer 15. Consequently variation of the impedance of the saturable core reactor 37 will vary the voltage impressed on the primary 41 of the autotransformer 42 and will thereby vary the voltage supplied to rectifier transformer 15. Thus, a decrease in reactor impedance will increase the portion of the input voltage which is impressed on the autotransformer primary 41 and will result in an increase in output voltage across output terminals 53, 54. Conversely, an increase in the impedance of reactor 37 will result in a decrease in the output voltage across terminals 53, 54.

In order to provide means for varying the reactor impedance by the proper amount to restore the output voltage to its original values at such times as it may vary due to changes in load or input voltage the electronic control circuit heretofore described is provided. Thus, any change in output voltage across terminals 53, 54 will result in a change in temperature of the filament of diode 13 which results in a change in the cathode emission of this tube and a relatively great change in the plate resistance of the tube. The signal voltage taken off across the diagonals 23, 24 of the bridge is applied to the beam power tube 25, the output of which is in turn fed over a circuit heretofore described to the primary winding 36 of the saturable reactor 37.

In order to make the operation clear it will be assumed that a rise in output voltage has occurred due to a reduction of the load or a rise in input voltage or both. This increased output voltage across terminals 53, 54 results in the application of a greater voltage to the diode filament and additional heating of that filament. With increased heating the cathode of the diode 13 produces increased emission and thus reduces the plate resistance of the tube. Since diode 13 forms an arm of a bridge circuit, as previously described, a change in its plate resistance will change the balance condition of the bridge resulting, in the present instance, in the application of a more negative potential to the control grid of the beam power tube 25.

This negative grid signal results in a sharp drop in the plate current of the tube 25 and consequently produces a reduced saturation of the saturable core reactor 37. This reduced D. C. saturation of the reactor 37 results in an increase in A. C. impedance and in turn results in lowering of the voltage in the primary 16 of transformer 15. This in turn results in a reduced voltage applied across the rectifier unit and a consequently reduced output voltage across terminals 53, 54.

The action described immediately above will continue until an equilibrium point is attained, i. e. until the net change in output voltage is sufficient to compensate for the changed conditions in the control circuit. The gain of the control system is of such magnitude that the direct current output voltage will be maintained constant within a tolerance of plus or minus 0.5%.

Tube 20 has already been described as a rectifier in the D. C. power supply for the bridge circuit diode 13. This rectifier tube 20 is supplied with filament heating current by means of the secondary 70 of transformer 27. Tube 31 has been described as supplying plate currents to the tube 25 and, of course, supplying current to the saturable core reactor winding 36. This tube 31 is supplied with filament heating current by means of a secondary winding 71 of transformer 27.

A variable resistance 62 is supplied in the circuit to the diode filament, adjustment of this resistance serving to adjust the output voltage to any desired point within the range of operation of the regulator.

In order to compensate for variations in the input voltage the potentiometer 59 is supplied, this potentiometer serving to adjust the bias on tube 25 and thereby compensate for variations in the voltage input.

A variable resistance 49a is supplied in the output of the rectifier in order to permit compensation for load variation. It will be clear that as the load increases the drop through resistor 49a will likewise increase and thus the current flowing in the filament circuit of the diode 13 will be proportionally varied and the resistance of the cathode anode circuit of the diode will then compensate for the load change.

As will be obvious the variation of the resistance in the filament circuit of the diode 13 varies the value of the output voltage necessary to obtain a given diode filament temperature and will thus control the output voltage.

A resistor 72 is connected between the plate and a screen grid 25a of the beam power tube 25, this resistor serving as a swamping resistor to absorb conductive surges which originate in the winding 36 of the saturable core reactor 37. This is necessary because of the very high inductance of this winding. Resistances 73 and 74 form part of a voltage divider network for supplying positive potential to the screen grid 25a.

The particular voltage regulator which is shown in Figure 1 was designed to provide an output voltage of 12 volts D. C. when operated from a supply of 115 volts single phase A. C. The unit was operable on a supply voltage having a maximum variation of 15% and operating at a frequency of from 50 to 60 cycles per second. The output voltage was adjustable from 11 to 13 volts, the output load being from 5 to 8.5 amperes. It was found that the output voltage could be held to within plus or minus 1% of the preset desired D. C. output. The values of the various circuit elements were as follows:

| | |
|---|---|
| Resistance 10, 11 and 12 | 1.9 megohms |
| Resistance 73 | 10,000 ohms |
| Resistance 74 | 25,000 ohms |
| Resistance 72 | 100,000 ohms |
| Resistance 59 | 15 ohms variable |
| Potentiometer 62 | 20 ohms |

Resistance 75 .................... 47,000 ohms
Condenser 76 .................... 1/10 microfarad
Condenser 77 .................... 1/10 microfarad
Condenser 78 .................... 4 microfarads
Condenser 80 .................... 8,000 microfarads
Condenser 56 .................... 8,000 microfarads
Condenser 81 .................... 25 microfarads In the specific unit above mentioned the vacuum tube 13 was one of the type known as the 8DC15, a temperature limited diode having a tungsten filament made by Sorensen & Company, Inc. of Stamford, Connecticut. The remaining three tubes are standard tubes, tube 20 being a 2X2 tube, tube 31 a 5Y3 tube and tube 25 being a 6L6 beam power tube. These three tube types are manufactured by the Radio Corporation of America and others under these designations.

While I have described a preferred form of my invention it will be understood that this description was for purposes of illustration only. The scope of the invention is, therefore, not to be limited by the above description but, on the contrary, to be limited solely by the appended claims.

What is claimed is:

1. In an accurate voltage regulator, in combination, an alterating current input circuit, an alternating current output circuit, means connected with said output circuit to convert the alternating current to direct current, a direct current output circuit from said means adapted to have a load connected therein, a balancing circuit including a diode electron tube as one of the elements thereof, a rectifying means for supplying a direct current voltage derived from said alternating current output circuit to said balancing network, means connected across said direct current output circuit for applying a voltage to the filament of said diode to thereby determine the balance condition of said network, an amplifier connected to said network and responsive to the degree of unbalance thereof, and means operable under control of said amplifier to maintain the direct current output voltage in said direct current output circuit at a constant value.

2. In an accurate voltage regulator, in combination, an alternating current input circuit, an alternating current output circuit, means connected with said output circuit to convert the alternating current to direct current, a direct current output circuit from said means adapted to have a load connected therein, a bridge network including a non-linear impedance as one of the arms thereof, means connected across said direct current output circuit for applying a voltage to said impedance to thereby determine the balance condition of said bridge, means for applying a direct current voltage derived from said alternating current output circuit to said bridge network, a capacitance across one of the bridge arms to prevent fluctuations in the power supplied thereto from affecting the output of said bridge, an amplifier connected across said bridge and responsive to the degree of unbalance thereof, and means under control of said amplifier to maintain the direct current output voltage in said direct current output circuit at a predetermined value.

3. In an accurate voltage regulator, in combination, an alternating current input circuit, an alternating current output circuit, means connected with said output circuit to convert alternating current to direct current, a direct current output circuit from said means adapted to have a load connected therein, a bridge network including a diode electron tube as one of the arms thereof, a rectifier means for supplying a voltage derived from said alternating current output circuit to said bridge network, means connected across said direct current output circuit for applying a voltage to the filament of said diode to thereby vary the impedance of said diode and determine the balance condition of said bridge, an amplifier connected across said bridge and responsive to the degree of unbalance of said bridge, and means operable under control of said amplifier to maintain the output voltage in said direct current output circuit at a predetermined value.

4. In an accurate voltage regulator, in combination, an alternating current input circuit, an alternating current output circuit, means connected with said output circuit to convert alternating current to direct current, a direct current output circuit from said means adapted to have a load connected therein, a bridge network including a diode electron tube as one of the arms thereof, the filament of said diode electron tube being connected across the direct current output circuit thereby altering the impedance of said diode in accordance with the variations in the output voltage of said direct current output circuit, a rectifier means for supplying a voltage derived from said alternating current output circuit to said bridge network, a capacitance across one of the arms of the bridge to prevent fluctuations in the rectified supply thereto from affecting the output of said bridge, an amplifier connected across said bridge and responsive to the degree of unbalance thereof, and means operable under control of said amplifier to maintain the output voltage in said direct current output circuit at a predetermined value.

5. In an accurate voltage regulator, in combination, an alternating current input circuit, an alternating current output circuit, a rectifier in said output circuit, a direct current output circuit supplied by said rectifier and adapted to have a load connected therein, a bridge network including a diode electron tube as one of the arms thereof, means connected across said direct current output circuit for applying a voltage to the filament of said diode to thereby determine the balance condition of said bridge, means for applying a rectified voltage derived from said alternating current output circuit to said bridge network, a capacitance across one of the arms of the bridge to prevent fluctuations in the rectified supply thereto from affecting the output of said bridge, an amplifier connected across said bridge and responsive to the degree of unbalance thereof, and means operable under control of said amplifier to maintain the alternating current output voltage and thereby to maintain the direct current output voltage at a predetermined value.

6. In an accurate voltage regulator, in combination, an alternating current input circuit, an alternating current output circuit, a rectifier in said alternating current output circuit, a direct current output circuit connected to said rectifier and adapted to have a load connected therein, a balancing network including a non-linearly variable impedance as one of the arms thereof, means connected across said direct current output circuit for applying a voltage to said impedance to thereby determine the balance condition of said network, an amplifier connected across said balancing network and responsive to the degree of unbalance thereof, a saturable core reactor connected across said alternating current input circuit, a saturating winding for said saturable reactor, said winding being connected in the output circuit of said amplifier, whereby variations in the direct current output voltage causes variations in the degree of saturation of said saturable core reactor and corresponding variations in the alternating current and direct current output voltages to thereby bring the direct current output voltage to a predetermined value.

7. In an accurate voltage regulator, in combination, an alternating current input circuit, an alternating current output circuit, a rectifier connected in said alternating current output circuit, a direct current output circuit fed by said rectifier and adapted to have a load connected therein, a bridge circuit comprising a plurality of resistors and a two-element electron tube, means for supplying said bridge circuit with direct current derived from said alternating current output, means connected across said direct current output for varying the potential applied to the filament of said electron tube to thereby vary the tube impedance and the balance of said bridge circuit, an amplifier connected across said bridge and responsive to the degree of unbalance thereof, a saturable core reactor and an autotransformer, the operating winding of said saturable core reactor and the primary of said autotransformer being connected in series across the alternating current input, the saturating winding of said saturable core reactor being connected in the output circuit of said amplifier, whereby minute variations in the direct current output voltage causes variations in the degree of saturation of said saturable core reactor and cause readjustment of said alternating current output voltage and consequent readjustment of said direct current output voltage in said direct current output circuit to its predetermined value.

8. In an accurate voltage regulator, in combination, an alternating current input circuit, means connected with said input circuit to convert alternating current to direct current, a direct current output circuit from said means adapted to have a load connected therein, a bridge network including a non-linear impedance as one of the arms thereof, means for applying a direct current voltage to the input terminals of said bridge, an output circuit for said bridge, means connected across said direct current output circuit for applying a voltage to said impedance to determine the balance condition of said bridge, a saturable core reactor and a rectifier transformer, the primary of said rectifier transformer and the alternating current coil of said saturable core reactor being connected in series across said alternating current input circuit, and a connection between said bridge output circuit and the direct current coil of said saturable core reactor.

9. In an accurate voltage regulator, in combination, an alternating current input circuit, means connected with said input circuit to convert alternating current to direct current, a direct current output circuit from said means adapted to have a load connected therein, a bridge network including a non-linear impedance as one of the arms thereof, means for applying a direct current voltage to the input terminals of said bridge, an output circuit for said bridge, means connected across said direct current output circuit for applying a voltage to said impedance to determine the balance condition of said bridge, a saturable core reactor, a connection between said bridge output circuit and the direct current coil of said saturable core reactor, an autotransformer, a rectifier transformer, the primary of said rectifier transformer and a portion of the coil of said autotransformer being connected in series across said alternating current input circuit, and another portion of said autotransformer coil and the alternating current coil of said saturable core reactor being also connected in series across said alternating current input, said first and second mentioned portions of said autotransformer coil being connected together.

HELEN S. SORENSEN,
*Administratrix of the Estate of Edward M. Sorensen, Deceased.*

REFERENCES CITED

The following references are of record in the file of this patent:

UNITED STATES PATENTS

| Number | Name | Date |
|---|---|---|
| 1,995,404 | Stoller | Mar. 26, 1935 |
| 2,019,352 | Livingston | Oct. 29, 1935 |
| 2,083,382 | Jutson et al. | June 8, 1937 |
| 2,129,890 | Trucksess | Sept. 13, 1938 |
| 2,349,685 | Trucksess | May 23, 1944 |